April 17, 1934.   T. ZUSCHLAG   1,954,975
METHOD AND APPARATUS FOR TESTING ELECTRICALLY CONDUCTING BODIES
Filed Aug. 6, 1932
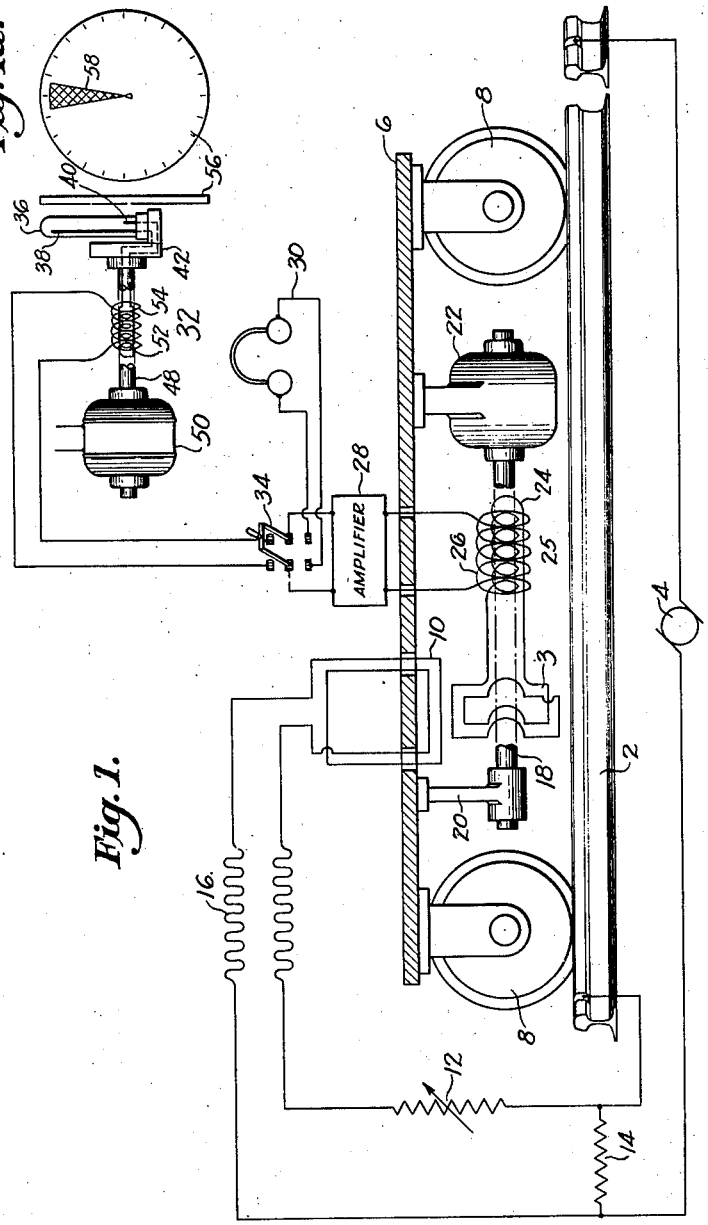
INVENTOR,
Theodor Zuschlag
BY
ATTORNEYS Patented Apr. 17, 1934

1,954,975

UNITED STATES PATENT OFFICE 1,954,975

METHOD AND APPARATUS FOR TESTING ELECTRICALLY CONDUCTING BODIES

Theodor Zuschlag, West Englewood, N. J., assignor to Magnetic Analysis Corporation, Long Island City, N. Y., a corporation of New York Application August 6, 1932, Serial No. 627,749

11 Claims. (Cl. 175—183)

The present invention relates to the art of magnetic analysis and comprises an improved non-destructive method of testing rails, bars, tubes, or the like electrical conductors for the determination of defects of a physical or chemical nature therein. The invention also includes novel apparatus for carrying out the method.

According to the present invention a direct or alternating current of suitable strength is passed through the conductor to be tested and the distribution of the current as determined from the resulting magnetic field is used for determining the characteristics of the specimen. The magnetic field about the specimen is investigated by the measurement of currents induced in an exploring coil moved relatively to the magnetic field of the specimen.

The present invention differs from the former ones of a like nature in that it elimates the use of all sliding contacts which heretofore have been a serious source of trouble. It also provides improved means for locating the position of a flaw. It also provides improved visual means for indicating a change in the magnetic field.

For a better understanding of the new method and of the novel apparatus forming a part of the invention reference should be made to the accompanying drawing of which:

Fig. 1 diagrammatically illustrates the improved apparatus for testing the specimen and devices for indicating the changes in the magnetic field; and Fig. 1a diagrammatically illustrates the visual representations given by the indicating device.

Referring to the drawing, the specimen to be tested is a railroad rail 2, through which direct current is passed from a generator 4, creating a magnetic field about the specimen. Direct current is preferred because of the large cross-sectional area of the specimen. The testing apparatus comprises a carrier 6 adapted for movement along rail 2 on non-conductive non-magnetic wheels 8. Supported by carrier 6 and connected in series with the rail across the generator 4 is a compensating coil 10 so disposed with relation to the rail as to have the current therethrough create a magnetic field which opposes that about the rail 2 created by the current through the rail. An adjustable resistor 12 is connected in series with coil 10 and a resistor 14 is bridged across resistor 12 and coil 10. Adjustment of the relative magnitudes of the currents through the rail and coil with consequent adjustment of the magnetic fields about each, may thus be effected by adjustment of resistor 12. As compensating coil 10 is supported by and movable with carrier 6, provision must be made for maintaining the coil connected with the source of supply current, as for example by permitting the connecting wires to elongate as indicated at 16.

An exploration coil 3 having its windings generally parallel to the current flow in the rail 2 and compensating coil 10 is supported on and rotated by a non-conductive non-magnetic axis 18 to simultaneously cut the magnetic fields of rail 4 and coil 10; the resultant E. M. F.'s induced in exploration coil 3 being opposed. Axis 18 is supported at one end in suitable bearing carried by a bracket 20 and at the other by driving motor 22, both of which are suitably secured to carrier 6. Exploration coil 3 is connected to means for indicating the E. M. F.'s set up therein through an electro-magnetic coupling 25. The use of the electro-magnetic coupling 25 eliminates a source of error heretofore met with when brushes and sliding contacts were used, the brush or contact resistances tended to make measurements of relatively weak magnetic fields uncertain and misleading. The terminals of coil 3 connect to the primary 24 which is rotatable in the secondary 26 connected to either ear phones 30 or the visual indicating device 32 through a double throw switch 34. Preferably a suitable amplifier 28 is interposed between the coupling 25 and indicating devices 30 and 32 for increasing the strength of the current flow to the indicators.

The indicating device 32 comprises a glow tube 36 filled with a suitable conducting gas, such as neon, and having a long electrode 38 and a short electrode 40. The tube is supported in any suitable manner for rotational motion. As illustrated, it is rigidly secured to a flange 42 mounted for rotational motion on axis 48 driven by motor 50. The electrodes 38 and 40 are connected to opposite ends of a secondary winding 52 mounted on shaft 48 and rotatable therewith; the stationary primary winding 54 associated with winding 52 being connected through switch 34 with the output terminals of the amplifier 28. A transparent screen 56 suitably graduated to indicate various conditions of test is placed in front of tube 36 with its center in alinement with axis 48. If a potential of sufficient magnitude is impressed across electrodes 38 and 40 a glow appears therein, its length and intensity depending upon the impressed voltage.

If tube 36 were stationary and a sufficient voltage were impressed across the electrodes the disposition of the glow would be alternately long and short due to the difference in length of the electrodes. If the tube is rotated synchronously with the frequency of the excitation voltage the peak of the glow will appear along one electrode when 90 degrees from zero position and along the other when 270 degrees from zero position. Similar glows corresponding to less than peak voltage but of opposite phase will be reflected from diametrically opposite points of the reflector. If the electrodes were of equal length, diametrically opposite glows of equal intensity would appear for each peak value which, due to the persistency of vision, would appear as steady glows on screen 56. Due to the electrode 40 being so short the glow along it merely results in a small spot of light adjacent the center of the screen, whereas the peak voltage along the electrode 38 appears as a steady glow, as indicated at 58 in Fig. 1a. If the phase of the impressed voltage across the tube varies the peak of the glow will shift to the right or left an amount depending upon the degree of phase shift. The visual indicating means which is the subject matter of a copending application is claimed herein only in combination with the other elements of the invention.

In operation the rail 4 and compensating coil 10 are energized to create opposing magnetic fields. Simultaneously motor 22 is started causing exploration coil 3 to rotate in the two magnetic fields. If the magnetic fields are unequal, the opposing induced electromotive forces will be unequal and consequently a current will flow through coil 3 and winding 24. Assuming the earphones 30 are connected to amplifier 28, the current through coil 3 and winding 24 will be indicated by sound in the earphones due to the magnetic coupling between windings 24 and 26. Resistance 12 is then varied until the noise disappears indicating that the system is in balance with the field created by the current through coil 10 equal and opposite to that created by the current through the rail. Then maintaining the current through coil 10 at the value at which the circuit is balanced, carrier 6 is moved along rail 4 and if any disturbances are present in the magnetic field of the specimen due to flaws therein the E. M. F.'s generated in coil 3 will be unequal and the resulting current flow will be indicated by a sound through the earphones 30. It is apparent that the disturbance will be in that part of the magnetic field in which exploration coil 3 is rotating, definitely locating the position of the flaw in that part of the rail in close proximity thereto. Several readings should then be taken with the coil in this position while increasing the current through the rail. If the disturbance is due to a latent defect the magnitude of the note in the earphones will increase, whereas if it is due to magnetization of the rail the magnitude will remain constant or decrease. Slight currents will also be induced in the system due to the relative movement of the coil 3 along the rail, but in comparison to the currents induced by the rapid rotation of the coil they will be negligible and may be disregarded.

If instead of the earphones, visual indications are desired, switch 34 is thrown to cut in apparatus 32. Motor 50 is run in synchronism with motor 22 and initial adjustment of the opposing magnetic fields to bring them to equality is effected, as in the case of the earphones, by varying resistance 12, until no glow appears upon screen 56. With the fields so adjusted, carrier 6 is moved along the rail to explore different portions of the field. If now, at any position of the carrier, E. M. F.'s induced in coil 3 are unequal, the differential current will be transmitted through the system and an amplified alternating voltage impressed on the tube electrodes to cause a glow to appear upon the screen 56. The presence of a glow in the tube gives an immediate indication of a flaw and experimentation will make it possible for the operator to determine the nature and magnitude of the flaw from the position and extent of the glow; screen 56 being suitably graduated for direct readings.

As will be evident to those skilled in the art the invention permits various modifications from the particular embodiment shown and described without departing from the spirit thereof or the scope of the claims. For example it is not essential that two separate motors 50 be provided as shafts 18 and 48 could be coupled together by suitable gearing for rotation by a single motor or tube 36 could be mounted directly upon an extension of shaft 18 in which case both magnetic couplings could be eliminated. This latter suggested arrangement, while theoretically possible and substantially simplifying the electrical circuits, is not as practicable as the particular arrangement illustrated because of the structural difficulties which would be involved in locating the various elements for convenient use.

The following is claimed:

1. The method of locating flaws in electrically conducting bodies which consists in creating a magnetic field by passing a current through the body to be tested, creating a second magnetic field by passing a current through a compensating coil, simultaneously cutting the lines of force of the two fields by a conductor to induce opposing E. M. F.'s therein, adjusting the E. M. F. induced in the conductor to zero by varying the current through the compensating coil, moving the conductor and compensating coil relative to the body to be tested and determining the characteristics of the body from the differential of the E. M. F.'s induced in the conductor.

2. The method of locating flaws in electrically conducting bodies which consists in creating a magnetic field by passing a current through the body to be tested, creating a second magnetic field in opposition to the field about the body by passing current through a compensating coil, simultaneously cutting the lines of force of the two fields by a conductor, impressing the differential of the E. M. F.'s induced in the conductor on the electrodes of a rotating glow tube, compensating the field by varying the current through the compensating coil until no glow appears, and moving the conductor and compensating coil relatively to the object to cause variations in the field about the body to be indicated by a glow.

3. The method of visually indicating the location of flaws in electrically conducting bodies which consists in passing a current through the body to be tested, moving a rotating conductor relatively to the object, rotating a glow tube synchronously with the conductor and inter-connecting the rotating conductor and the electrodes of the rotating glow tube whereupon an E. M. F. induced in the conductor will produce a glow in the tube.

4. Apparatus for locating flaws in electrically conducting bodies comprising in combination a compensating coil, means for passing current through the body to be tested and through the compensating coil, to create opposing magnetic fields thereabout, a conductor and means for rotating the same in said opposing fields, means for moving the compensating coil and rotating conductor relatively to the object and means for indicating the differential of the E. M. F.'s induced in the conductor.

5. Apparatus for locating flaws in electrically conducting bodies comprising in combination a compensating coil, means for passing current through the body to be tested and through the compensating coil to create opposing fields thereabout, means for varying the relative magnitude of the currents through the compensating coil and body, a conductor and means for rotating the same in said opposed fields, means for moving the compensating coil and the rotating conductor relatively to the body, an indicating device and electro-magnetic means for coupling said rotating conductor to said device.

6. Apparatus for testing rails comprising, in combination, means for passing a current through the rail, a conductor, means for rotating the conductor, a carrier supporting the conductor in proximity to the rail and adapted to move relatively thereto, means for indicating E. M. F.'s induced in the conductor, and electro-magnetic means for coupling the indicating means and said conductor, said coupling means comprising a transformer one winding of which is connected to said conductor and rotates therewith and the other winding of which is connected with said indicating means.

7. Apparatus for testing rails comprising, in combination, a compensating coil, means for passing current through the rail and through the compensating coil to create opposing magnetic fields thereabout, a conductor located in the opposing fields about the compensating coil and the rail, means for rotating the conductor, a carrier supporting the compensating coil and the conductor and adapted to move them relatively to the rail, a device for indicating the differential of the E. M. F.'s induced in the conductor and means including an electro-magnetic coupling for connecting said conductor with said device.

8. Apparatus for testing rails comprising, in combination, a compensating coil, means for passing current through the rail and through the compensating coil to create opposing magnetic fields thereabout, means for varying the relative magnitudes of the currents passing through the compensating coil and rail, a conductor disposed in said opposed fields, means for rotating the conductor, a carrier supporting the compensating coil and the conductor and adapted to move them relatively to the rail, means for amplifying and indicating the differential of the E. M. F.'s induced in the conductor, the conductor and indicating means being interconnected through an electro-magnetic coupling.

9. Apparatus for testing rails comprising, in combination, means for passing a current through the rail, a conductor, means for rotating the conductor, a carrier supporting the conductor in proximity to the rail and adapted to move it relatively thereto, and means for visually indicating the E. M. F. induced in the conductor comprising a gas filled glow tube having its electrodes interconnected with the conductor and adapted to be rotated synchronously therewith.

10. Apparatus according to claim 9 including a compensating coil and means for passing current therethrough, said coil being supported by said carrier and so located with respect to said conductor as to have the current through the coil create a magnetic field effective to induce in said conductor when rotated an E. M. F. opposing that induced by the field about the rail whereby the rotating gas filled tube indicates the differential of the E. M. F.'s induced in said conductor and the compensating coil provides a standard with which the field about different portions of the rail may be compared.

11. Apparatus for testing rails comprising in combination a compensating coil, means for passing current through the compensating coil and through the rail, means for varying the current in the compensating coil, a conductor interposed between the compensating coil and the rail, means for rotating the conductor, a carrier supporting the compensating coil and the conductor and adapted to move them relatively to the rail, and means for indicating the E. M. F.'s induced in the conductor said last mentioned means comprising a gas filled tube having its electrodes electromagnetically coupled with the conductor and being rotated synchronously therewith.

THEODOR ZUSCHLAG.